Figure 1:
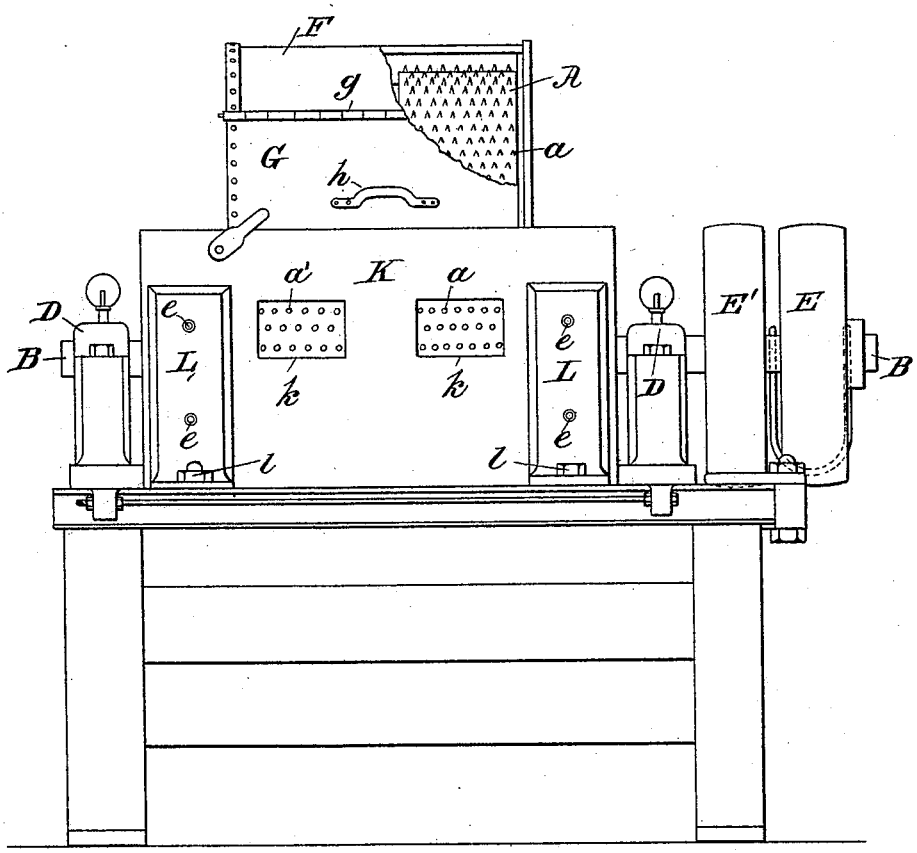

(No Model.) 3 Sheets—Sheet 1.
J. B. TORRILHON.
APPARATUS FOR REMOVING AMORPHOUS CELLULOSE AND FIBER FROM COCOANUT HUSKS.

No. 496,075. Patented Apr. 25, 1893.

(No Model.) 3 Sheets—Sheet 3.
J. B. TORRILHON.
APPARATUS FOR REMOVING AMORPHOUS CELLULOSE AND FIBER FROM COCOANUT HUSKS.
No. 496,075. Patented Apr. 25, 1893.
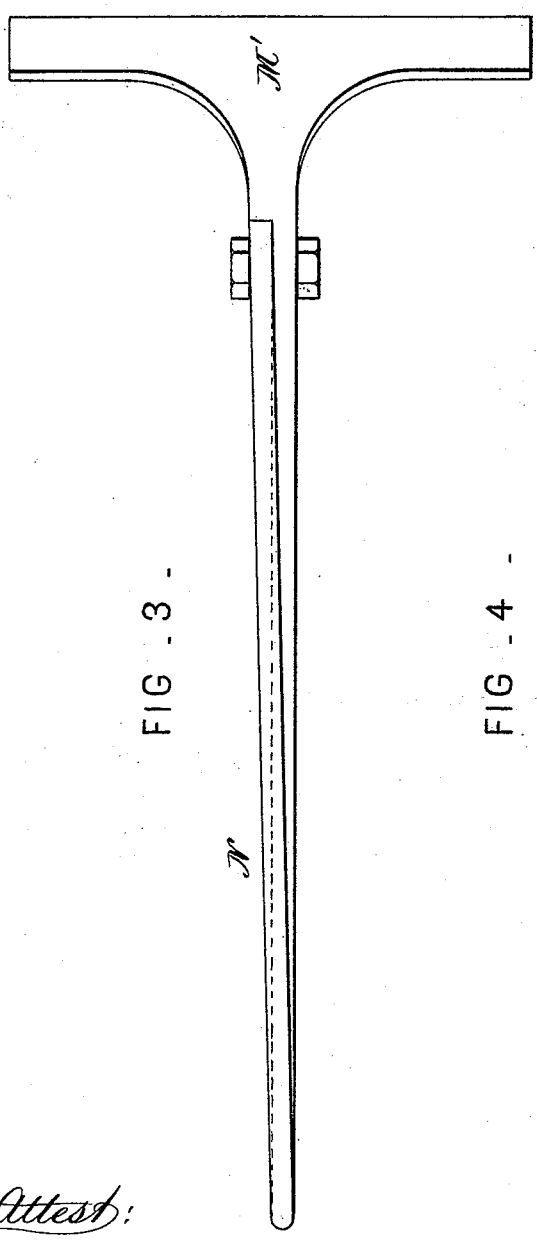
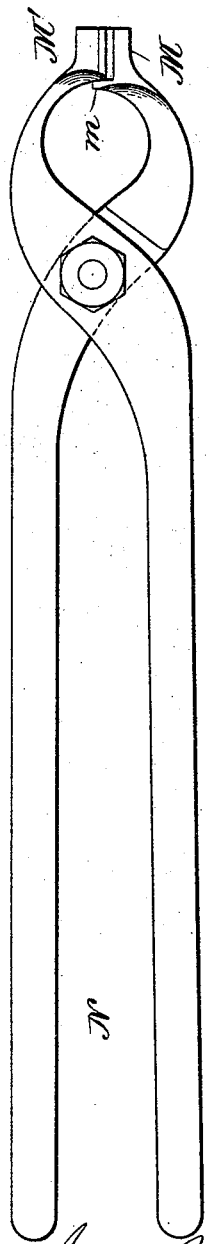

UNITED STATES PATENT OFFICE.

JEAN BAPTISTE TORRILHON, OF CLERMONT-FERRAND, FRANCE.

APPARATUS FOR REMOVING AMORPHOUS CELLULOSE AND FIBER FROM COCOANUT-HUSKS.

SPECIFICATION forming part of Letters Patent No. 496,075, dated April 25, 1893.

Application filed May 14, 1892. Serial No. 433,033. (No model.) Patented in France April 8, 1889, No. 196,095.

*To all whom it may concern:*

Be it known that I, JEAN BAPTISTE TORRILHON, a resident of Clermont-Ferrand, Department of Puy-de-Dôme, Republic of France, have invented a new and useful Improvement in Apparatus for Removing Amorphous Cellulose and Fiber from Cocoanut-Husks, which improvement is fully set forth in the following specification and which was patented in France April 8, 1889, No. 196,095.

This invention has reference to the preparation of cellulose to be used for the purpose specified in United States Letters-Patent No. 425,363, granted April 8, 1890, to L. Pallu de la Barrière; namely as a protection to vessels against ingress of water in case of penetration of the wall of the vessel by a projectile, or as the result of a collision or other casualty. This amorphous cellulose is obtained from the husk of the cocoa-nut, in which it is associated with long, coarse fibers which are matted together by the cellulose. This mixture of fiber and cellulose lies next the nut, and is incased by a hard woody skin or envelope to which the fibers adhere tenaciously.

The extraction of the cellulose is a difficult operation, and heretofore it has been effected by feeding the husk to rollers, whereby the fiber, cellulose and outer skin are disintegrated. This operation has to be very carefully conducted in order to avoid crushing the cellulose, which with the utmost precaution would occur to some extent. Moreover, the product of this operation contained the cellulose in admixture with all the fibers of the husk, and also in admixture with the woody particles of the skin. The former had to be separated by another operation, and the presence of the latter, which has little or no obturating properties, impaired the quality of the product for the purposes in view.

The object of the present invention is to obviate these objections, which object is effected by stripping or combing the cellulose from the other portions of the husk, leaving the skin or outer envelope, with the greater part of the fiber adhering thereto.

The invention includes apparatus for carrying out this process effectually and expeditiously, and this apparatus comprises two essential parts, viz., the holder or gripper, whereby the husk is held during the operation, and the stripper or separator, which removes the cellulose. The gripper is most conveniently of such form as to be held in the hand of the workman, who presents the husk to the separator. As hereinafter described it consists of a pair of tongs with broad jaws at right angles with the handle, the adjacent edges of the jaws being provided with serrations or teeth which fit into each other. The construction is specially adapted to hold the hard piece of husk by one end while the other is presented to the stripper, and then to seize and hold with equal firmness the end first acted upon by the stripper, which has torn out the cellulose and separated or combed the fibers into a loose mass. The separator or stripper comprises a series of teeth arranged on the periphery of a drum, which in operation is rapidly rotated, and a guard or fender which prevents the tongs being drawn into contact with the teeth and thereby breaking them. The teeth are arranged obliquely to the plane of operation, and so spaced that every portion of the husk is acted upon, and the cellulose thoroughly combed out.

The operation, of course, detaches some of the fiber from the husk; but the amount carried off with the cellulose is proportionately small, so that the subsequent step of separating is much simplified.

In order that the invention may be fully understood by persons skilled in the art to which it relates, it will now be described more in detail, reference being had to the accompanying drawings, in which—

Figure 2:
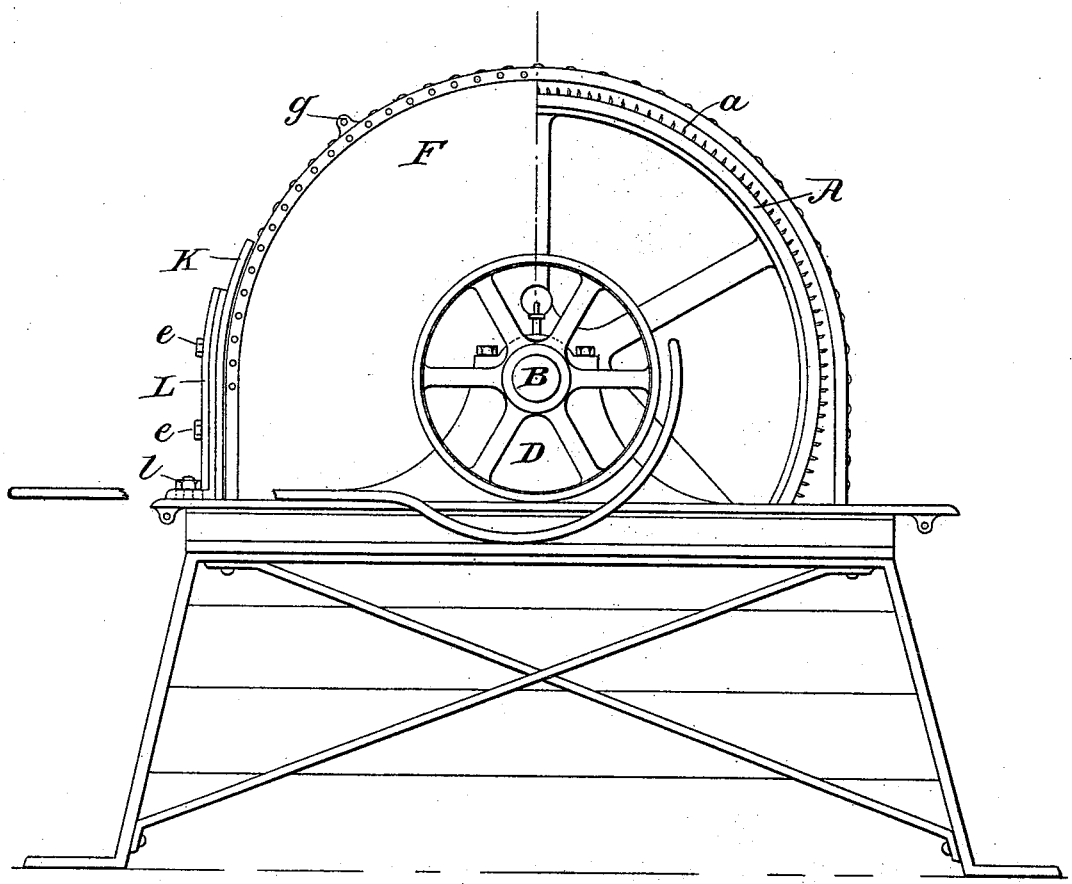

Figure 1, is a front elevation of the separator or stripper. Fig. 2, is a side elevation thereof. Fig. 3, is a top view of the gripper. Fig. 4, is a side view thereof, and Fig. 5, is a face view of the jaws.

A represents a toothed drum mounted on a shaft B which is journaled in bearings D, and carries the fast and loose pulleys E E'. The wheel is inclosed in a semi-cylindrical housing F, which in front is provided with a door G hinged at $g$, and having a handle $h$ for opening it to give access to the drum for the purpose of clearing the teeth of fiber. Beneath the door G is the upright guard plate K having two openings $k$ exposing the teeth of the drum. The teeth are arranged in two sets $a$, $a'$, so that when necessary one set of teeth can be removed without putting the machine out of use.

Guard-plate K is fixed by screws $e$ to the brackets L which rest on the base of the frame and are held in place by the bolts $l$ and the clamping nuts thereon. The bolts $l$ are fixed to the frame and pass through slots in the horizontal parts of brackets L, permitting adjustment of the guard-plate toward and away from the drum. The distance of the guard plate from the drum is regulated according to the thickness of the husk and the amount of cellulose it is desired to remove therefrom.

To insure the thorough removal of the cellulose from the husk, the teeth $a$ $a'$ are arranged so that each successive tooth in the direction of rotation is a little to the right or left of the preceeding tooth. As shown, the teeth are disposed in parallel oblique rows, each row beginning at a distance from the edge of the drum A different from the point of beginning of the adjacent rows.

The gripper (Figs. 3, 4 and 5) is shown in the form of a pair of tongs adapted to be manipulated by hand. The gripping jaws M M' are at right angles with the handle N, and are considerably broader than the openings $k$ in the guard plate K, the object being to prevent collision of the jaws with the rapidly revolving teeth of drum A. The faces of the jaws M M' are indented at the middle, forming teeth which fit into one another, so that the jaws can be made to approach very close together. So constructed the gripper can take firm hold of the hard husk in its natural state, or of the loose fibers after the cellulose has been combed out.

It will be understood that the gripper must be able to hold the husk firmly against the very strong pull of the rotating toothed drum. The lower jaw M has a rib or tooth $m$ which projects past the jaw M' and engages under the tough burr usually found on the inside of the husk at its end.

The operation of the apparatus will now be readily understood. The workman seizes one end of the husk between the middle or toothed part of the gripper-jaws, and thrusts the other end through one of the openings $k$ of the guard-plate. The teeth of the drum tear out the cellulose, and draw the husk for a certain distance into the housing of the drum, this distance being gaged by the guard-plate, which also prevents contact of the gripper jaws with the teeth $a$ $a'$. In a very brief space of time the cellulose is removed from this end of the husk, and the fibers are loosened and separated. The operator then reverses the position of the husk and completes the removal of the cellulose therefrom. The fibers which are thrown to one side, may be treated for various commercial purposes, and the cellulose, which falls from the under side of the wheel, is removed by any suitable means, and prepared for use for the purposes stated in the patent above referred to.

The cellulose obtained by this process is not injuriously crushed, as was frequently the case heretofore, is mixed with a relatively small proportion of fiber, and is wholly free from particles of the hard outer skin.

Having now fully described my invention, what I claim, and desire to secure by Letters Patent, is—

1. The combination with the rotatory toothed drum, and the guard plate having an opening of sufficient width to admit a husk, of the gripper, comprising holding jaws having faces broader than said opening, substantially as described.

2. The combination with the rotatory toothed drum, and a guard plate having a feed-opening therein of a gripper comprising holding jaws indented in their adjacent faces, the latter being broader than the opening in the guard plate the teeth in one jaw being opposite to notches in the other, substantially as described.

3. The combination with the rotatory toothed drum, and the guard-plate having a feed-opening therein of a gripper comprising indented or serrated jaws, having faces broader than said feed-opening one of said jaws having a rib or tooth projecting from its inner edge past the edge of the other jaw when said jaws are closed, substantially as described.

In testimony whereof I have signed this specification in the presence of two subscribing witnesses.

JEAN BAPTISTE TORRILHON.

Witnesses:
GEORGE R. OSTHEIMER,
A. NOURTIER.